(12) United States Patent
Gillis

(10) Patent No.: US 11,030,332 B1
(45) Date of Patent: Jun. 8, 2021

(54) DATABASE CONTROLLED WEB SERVICE TYPE ARCHITECTURE

(71) Applicant: Wells Fargo Bank, N.A., San Francisco, CA (US)

(72) Inventor: Nicholas R. Gillis, West Des Moines, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 704 days.

(21) Appl. No.: 14/684,708

(22) Filed: Apr. 13, 2015

(51) Int. Cl.
*G06F 21/62* (2013.01)
*G06F 16/25* (2019.01)

(52) U.S. Cl.
CPC .......... *G06F 21/6218* (2013.01); *G06F 16/25* (2019.01)

(58) Field of Classification Search
CPC . G06F 17/30893; G06F 16/25; G06F 21/6218
See application file for complete search history.

(56) References Cited

U.S. PATENT DOCUMENTS

| | | | |
|---|---|---|---|
| 7,448,047 B2 | 11/2008 | Poole et al. | |
| 8,578,487 B2 | 11/2013 | Soeder | |
| 8,924,408 B2 | 12/2014 | Brown et al. | |
| 9,237,143 B1* | 1/2016 | Dotan | H04L 63/08 |
| 9,736,454 B2* | 8/2017 | Hannuksela | H04N 13/0048 |
| 2002/0120685 A1* | 8/2002 | Srivastava | G06F 9/44 709/203 |
| 2004/0199636 A1 | 10/2004 | Brown et al. | |
| 2006/0130019 A1* | 6/2006 | Cool | G06F 21/52 717/140 |
| 2007/0255743 A1* | 11/2007 | Gaucas | G06F 21/608 |
| 2007/0276784 A1* | 11/2007 | Piedmonte | G06F 16/2453 |
| 2008/0027944 A1* | 1/2008 | Itikarlapalli | H04L 67/16 |
| 2009/0043726 A1* | 2/2009 | Watzke | G06F 16/283 |
| 2009/0089869 A1* | 4/2009 | Varghese | G06F 21/31 726/7 |
| 2009/0094137 A1* | 4/2009 | Toppenberg | G06Q 30/02 705/26.1 |
| 2009/0138313 A1* | 5/2009 | Morgan | G06Q 10/06 705/7.23 |
| 2009/0144381 A1* | 6/2009 | Li | G06Q 40/02 709/206 |
| 2009/0254971 A1* | 10/2009 | Herz | G06Q 10/10 726/1 |
| 2009/0309570 A1* | 12/2009 | Lehmann | G06F 1/26 323/318 |

(Continued)

*Primary Examiner* — Mohammad S Rostami
(74) *Attorney, Agent, or Firm* — Merchant & Gould P.C.

(57) ABSTRACT

A first electronic computing device includes a processing unit and system memory. A first electronic database is installed on the first electronic computing device. The system memory includes instructions which, when executed by the processing unit, cause the first electronic database to receive a request from a second electronic computing device to access information stored on the first electronic database. A web services catalog that is part of the first electronic database is used to determine an access authorization level for the request. When a determination is made that the access authorization level is valid for the request, a security check is performed on a syntax of the access request. When a determination is made that the syntax is valid, the requested information is obtained from one or more tables in the first electronic database and the requested information is sent to the second electronic computing device.

13 Claims, 8 Drawing Sheets

(56) References Cited

U.S. PATENT DOCUMENTS

| | | | |
|---|---|---|---|
| 2010/0094838 A1* | 4/2010 | Kozak | G06F 16/2443 707/705 |
| 2010/0281311 A1* | 11/2010 | Gao | H04L 63/168 714/49 |
| 2012/0017200 A1* | 1/2012 | Ghosh | G06F 11/3684 717/126 |
| 2012/0096554 A1* | 4/2012 | Stranne | G06F 21/566 726/24 |
| 2012/0137360 A1* | 5/2012 | Henderson | H04L 63/102 726/17 |
| 2012/0260344 A1* | 10/2012 | Maor | G06F 11/3688 726/25 |
| 2014/0120885 A1* | 5/2014 | Luneau | H04M 3/2281 455/414.1 |
| 2014/0130158 A1* | 5/2014 | Wang | G06F 21/566 726/23 |
| 2015/0026215 A1* | 1/2015 | Goel | G06F 21/604 707/784 |
| 2015/0088913 A1* | 3/2015 | Feng | G06F 16/284 707/751 |
| 2015/0106928 A1* | 4/2015 | Steinmann | H04L 51/30 726/23 |
| 2015/0120915 A1* | 4/2015 | Erb | H04L 63/20 709/224 |
| 2015/0271179 A1* | 9/2015 | Wang | H04L 63/10 726/30 |
| 2015/0281257 A1* | 10/2015 | Hart | H04L 63/14 726/23 |
| 2015/0334125 A1* | 11/2015 | Bartos | H04L 63/1416 726/24 |
| 2016/0179884 A1* | 6/2016 | Jerzak | G06F 16/2455 707/718 |
| 2016/0253500 A1* | 9/2016 | Alme | G06F 17/30327 726/23 |
| 2017/0097896 A1* | 4/2017 | Molnar | G06F 12/145 |

* cited by examiner

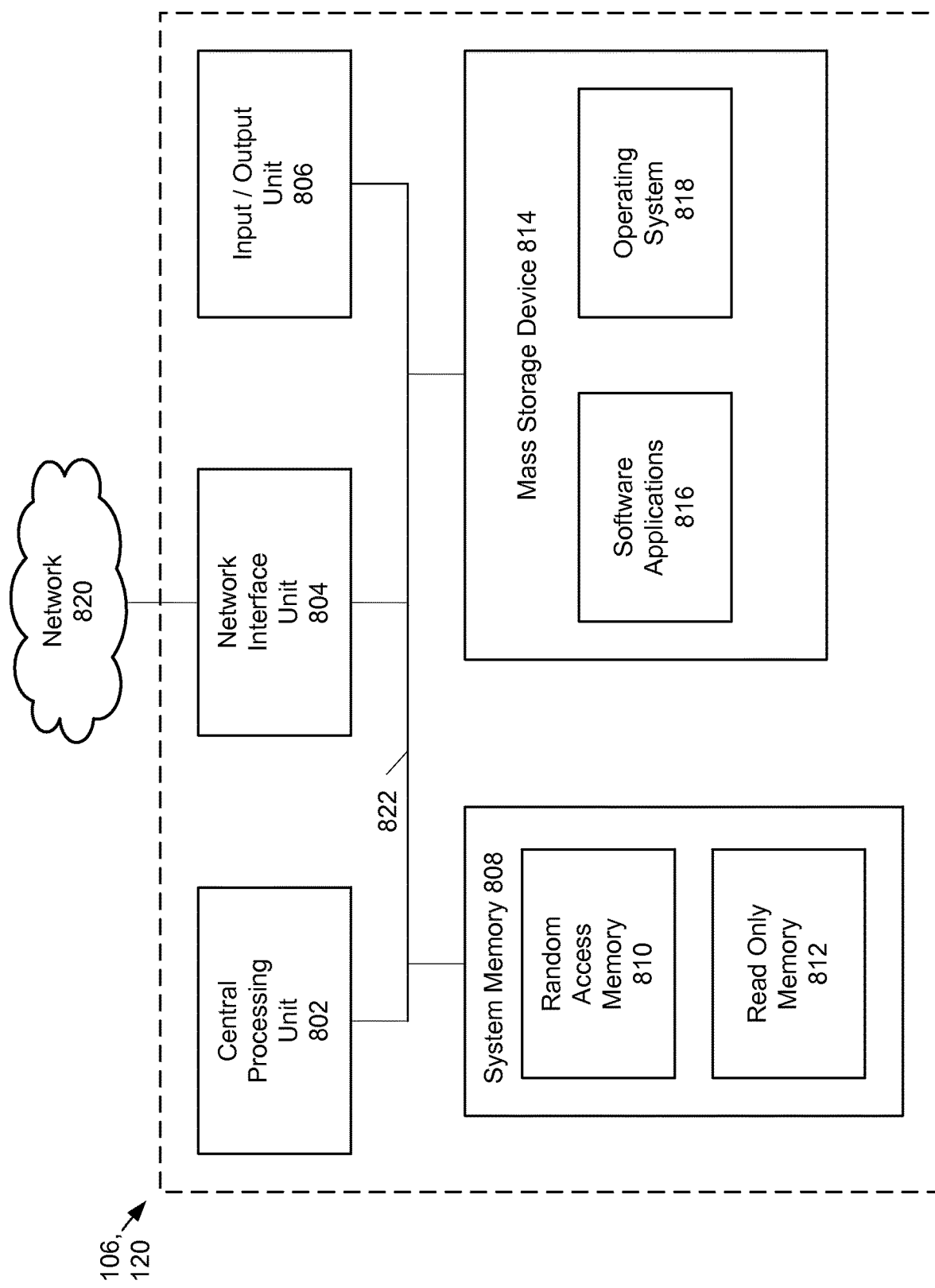

DATABASE CONTROLLED WEB SERVICE TYPE ARCHITECTURE

INTRODUCTION

Web services can be used to access a database and to retrieve requested information from the database. A web server computer can process a request for the web services and access the database to obtain the requested information. When data needs to be obtained from another database, a request for the data is typically sent to the web server computer and the web server computer can access the data from the other database.

Security checking on the web server computer can be used to attempt to prevent any malicious code in the request from reaching a database. However, the security checking typically needs to be programmed by a software professional with knowledge of how to program the web server computer. In addition, a security checking program on the web server computer can include weaknesses that can be exploited by criminals and hackers.

SUMMARY

Embodiments of the disclosure are directed to a first electronic computing device. The first electronic computing device comprises a processing unit and system memory. A first electronic database is installed on the first electronic computing device and stored in the system memory. The system memory includes instructions which, when executed by the processing unit, cause the first electronic database to: receive a request from a second electronic computing device to access information stored on the first electronic database; use a web services catalog that is part of the first electronic database to determine an access authorization level for the request; and when a determination is made that the access authorization level is valid for the request: perform a security check on a syntax of the access request; when a determination is made that the syntax is valid: obtain the requested information from one or more tables in the first electronic database; and send the requested information to the second electronic computing device.

In another aspect, a computer-readable data storage memory comprising instructions that, when executed by a processing unit of a first electronic computing device, cause the processing unit to: receive a request from a second electronic computing device to access information stored on a first electronic database, the first electronic database being installed on the first electronic computing device; determine an access authorization level for the request; and when a determination is made that the access authorization level is valid for the request: perform a security check on a syntax of the access request; when a determination is made that the access request is valid: obtain the requested information; and send the requested information to the electronic computing device.

In yet another aspect, a first electronic computing device comprises: a processing unit; and system memory. A first electronic database is installed on the first electronic computing device and stored in the system memory. The system memory includes instructions which, when executed by the processing unit, cause the electronic computing device to: receive a request from a second electronic computing device to access information stored on the first electronic database; use a web services catalog that is part of the first electronic database to determine an access authorization level for the request, the determination of the access authorization level comprising: determining an identity of a user making the request; determining an authorization level for the user; and determining a date and time for which the user is authorized to make the request; when a determination is made that the access authorization level is valid for the request: perform a security check on a syntax of the access request; when a determination is made that the syntax is valid: obtain the requested information from one or more tables in the first electronic database; and send the requested information to the second electronic computing device; identify information to be requested from a second electronic database; send a request for the identified information directly to the second electronic database; and receive the identified information from the second electronic database; and when a determination is made that the access authorization level is not valid for the request, send a null output to the second electronic computing device.

The details of one or more techniques are set forth in the accompanying drawings and the description below. Other features, objects, and advantages of these techniques will be apparent from the description, drawings, and claims.

DESCRIPTION OF THE DRAWINGS

FIG. 8 shows example physical components of an electronic computing device on which a database of FIG. 1 is installed.

DETAILED DESCRIPTION

The present disclosure is directed to systems and methods for implementing web services on a database. Using the systems and methods, web service procedures can be implemented on the database and processed on the database. In addition, because database access requests can be processed on the database, communication with additional databases can be initiated from one database and sent directly to another database, minimizing the need to use a web host as an intermediary device.

The systems and methods permit the web service procedures to be written using a database scripting language. This permits individuals familiar with database scripting languages to write custom database access procedures, minimizing the need for having web procedures programmed and compiled on a web server by a professional programmer.

The systems and methods also permit security checking to be implemented on the database. Request messages can be parsed on the database and rejected when a syntax of the request messages is not in a required format. Rejection can take the form of responding with an error message or with a null data set.

The systems and methods also permit a web services catalog to be stored on the database. The web services catalog can organize the web services from inside the database. The web services catalog can store data tables available on the database and can also store security access roles and IDs, user logs and event tracking information. The web services catalog permits a user to know what is available on the database and how the database is organized.

The systems and methods can be used both with an external web host and without an external web host. In some implementations, an external web host can receive and parse request strings from client devices, for example URL request strings, and send the request strings to an identified database. In other implementations, an external web host may not be used. Instead, a client device can access a Graphical User Interface (GUI) file on a shared drive account. The GUI file on the shared drive account can permit a database to be accessed directly from a client device without accessing a web host. In some implementations, the GUI is an HTML-based GUI and the file is an HTML file. In other implementations, other types of GUIs and associated files can be used, for example GUIs built via Java, .Net or something similar.

Figure 1:
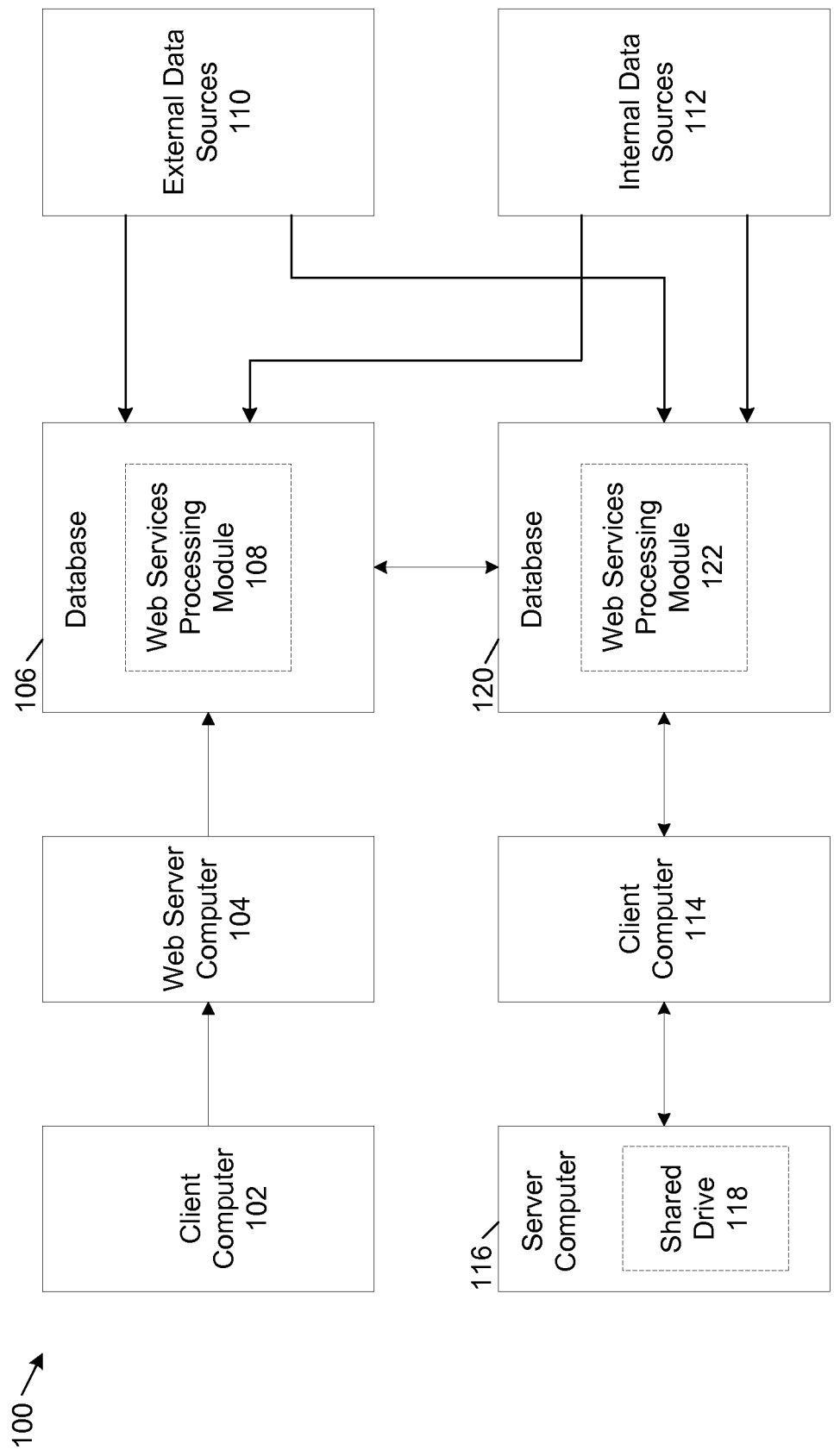
FIG. 1 shows an example system having a database controlled web services architecture.

FIG. 1 shows an example system 100 that can support a database controlled web services architecture. The system 100 includes client computers 102, 114, web server computer 104, server computer 116, databases 106 and 120, external data sources 110 and internal data sources 112. Databases 106 and 120 include web services processing modules 108 and 122, respectively. Each database 106 and 120 is a software program that is installed on an electronic computing device, for example on a client computer or a server computer, and is stored in system memory on the electronic computing device. Server computer 116 includes a shared drive 118. More or fewer client computers and server computers can be used. More or fewer databases can be used.

The example client computers 102 and 114 can be desktop computers, laptop computers or tablet computers. Client computer 102 can include a web browser that can display a web page rendered by web server computer 104. Client computer 114 can access a GUI file, for example an HTML file, on shared drive 118 on server computer 116. In implementations using the shared drive 118, database 120 can be accessed directly from client computer 114 through the GUI file without needing to access an intermediary web host, such as a web host on web server computer 104.

The example web server computer 104 is a web host that can render web pages on client computer 102. A user at client computer 102 can use a web browser to select a database to access and to select a web services operation from the database. For example, the user can request specific information, for example a list of social security numbers for employees of a company, from database 106. When the user requests the specific information, the request is sent to web server computer 104. Web server computer 104 can parse the request and then send the request to database 106. As stated earlier herein, in some implementations, web server computer 104 can be bypassed and the request can be sent from client computer 114 to database 120 using the shared drive 118 on server computer 116.

The example databases 106, 120 are electronic databases that include web services processing modules 108 and 122, respectively. As discussed in more detail later herein, web services processing modules 108, 122 include software modules for receiving and parsing requests for web services, for performing security checking on received request strings, for implementing and executing the web procedures and for returning a response to client computers 102, 114. Requested data can be accessed from data stored on database 106 or database 120. In addition, requested data can be accessed directly from other databases that include a web services processing module, such as web services processing modules 108 and 122. When using the web services processing modules 108 and 122 an intermediary web host is not needed to communicate requests from database 106 to database 120 or from database 120 to database 106.

Databases 106 and 120 can receive and store data from both internal and external data sources. Internal data sources, for example internal data sources 110, can comprise databases and other data stores that are internal to an organization. External data sources, for example external data sources 112, can comprise databases and other data stores that are external to the organization.

The systems and methods disclosed herein improve efficiencies for processing web services requests. By including a web services processing module on a database, web services requests for database information can be initiated directly from a database. Initiating a request for web services from a database improves bandwidth and efficiency because the use of an intermediate web server computer can be eliminated. Instead of sending a request from one database to a web server computer and having the web server computer send the request to a second database, the database initiating the request can send the request directly to the second database.

Figure 2:
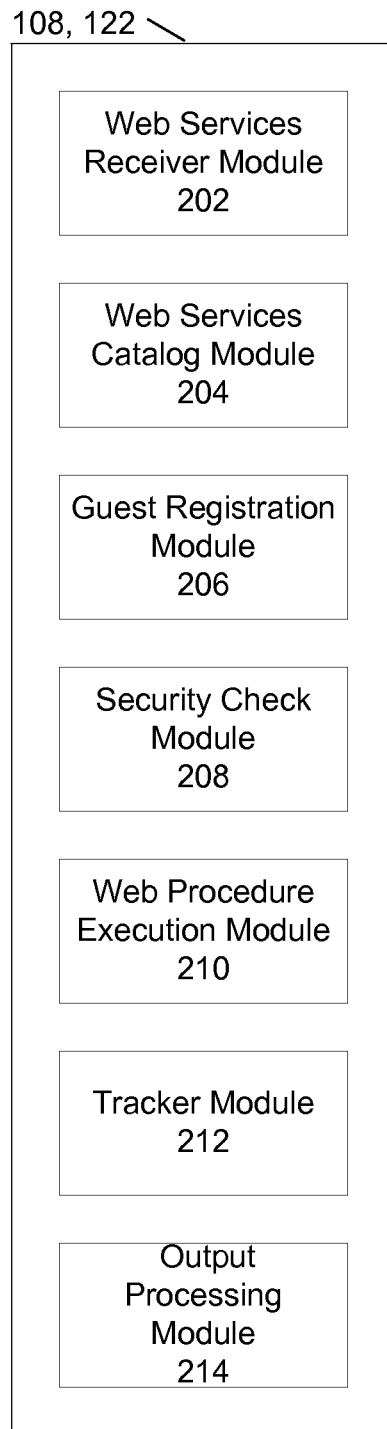
FIG. 2 shows example sub-modules of the web services processing module of FIG. 1.

FIG. 2 shows example modules of web services processing modules 108 and 122. The example modules include a web services receiver module 202, a web services catalog module 204, a guest registration module 206, a security check module 208, a web procedure execution module 210, a tracker module 212 and an output processing module 214. Other modules are possible.

The web services receiver module 202 processes requests for web services received from either a web host, for example from web server computer 104, or directly from a client computer using a shared drive, for example from client computer 114 using shared drive 118. Processing requests comprises parsing the request using a language decoder and security screener to determine a type of request, to determine whether a person making the request is authorized to do so, and to determine whether the syntax of the request is valid. Requests are processed in conjunction with a web services catalog, as explained next herein.

The web services catalog module 204 contains lists of tables, views, functions, procedures, roles and user accounts for databases 106 and 120. The tables include a dictionary of the tables, views, procedures, functions, users and roles. Other tables include a user log table, a guest log table and a service tracking table. The views designate a degree to which information is available to users. A privileged view permits a display of all information stored in the web services catalog. A public view only permits a display of information designated as public information. Roles permit the user to access procedures through a web service. Each role includes a security ID which identifies an authorization level for the user. In addition, the web services catalog designates a web host restricted role as the primary role for a web host to connect to. The web host restricted role includes only procedures and functions. The web services catalog also includes a web host user account for the web host to gain access to web server computer 104.

Functions included in the web services catalog module 204 include determining a catalog ID based on a catalog name, determining whether a security role ID exists, determining whether a user ID exists, determining whether a user ID is linked to a security role ID, determining whether a user name is permitted to access a procedure, determining a user ID based on a user name and determining whether a guest user ID can be found from a user name. Other functions can be used.

Procedures included in the web services catalog module 204 include registering guest users, tracking a request and storing an event corresponding to the request in a service tracking table, returning a list of alerts to a user calling a procedure, returning results for privileged catalog access, returning results for public catalog access, displaying a welcome message to the user, creating a link between a user ID and a security role ID and destroying a link between the user ID and a security role ID.

In addition to the procedures mentioned above, the web services catalog module 204 can include a plurality of custom procedures. The custom procedures can be created by a database administrator or any personnel familiar with writing scripts for the database. Some example procedures can include obtaining social security numbers for employees of an organization, obtaining salary information for an employee, creating a list of employees that have worked for the organization greater than 10 years and obtaining zip code information for an employee. Other custom procedures are possible.

The example guest registration module 206 determines whether a user name has an associated user ID in the web services catalog. When a user ID is not found for a user, the guest registration module 206 determines whether a guest log in the web services catalog contains a user ID for the user name. When a user ID is not found for the user in the guest log, the user is registered as a guest user in the guest log and a guest ID is assigned to the user.

The example security check module 208 decodes web procedure string parameters to determine whether the string parameters are valid. To minimize the risk of unauthorized access to database 106 or to database 120, the web services catalog module 204 requires a specific syntax for web procedure calls. For example, a SQL command of EXECUTE can be required to have a syntax of *EXE*CUTE* or something similar. When the syntax of the web procedure string parameters is not of the required syntax, or if unexpected strings are encountered, the security check module 208 can issue a security violation. When a security violation is issued, a requested web procedure is not executed. Instead null results are returned. In this manner, the security check module 208 can minimize a risk of malware in the database and minimize or eliminate security risks such as SQL injection hacks.

The example web procedure execution module 210 executes web procedures that are implemented on database 106 or on database 120. A particular web procedure that is executed is identified via string parameters in the web procedures request string. A web procedure is only executed if the security check module 208 determines that there are no security violations in the web procedure string parameters.

The web procedure execution module 210 permits database administrators or other personnel to create and store web procedure scripts using standard database languages such as SQL and scripting languages such as Java Script. The web procedure scripts can be implemented without the need of compiling software and without the knowledge of web server programming languages. This improves efficiencies and generally reduces costs associated with creating web procedures.

The example tracker module 212 determines whether the web procedure specified in the web procedures request string is registered in the web services catalog. When the specified web procedure is registered in the web services catalog, an event corresponding to an activation of the web procedure is tracked in a user service tracking register or a guest user service tracking register.

The example output processing module 214 formats documents obtained from database tables as a result of a web procedure and returns the documents to the requesting user. In some examples, the documents can be returned in an XML EXCEL spreadsheet format. In other examples, the documents can be returned as an HTML template or as an XML template (not EXCEL). Other output formats are possible.

Figure 3:
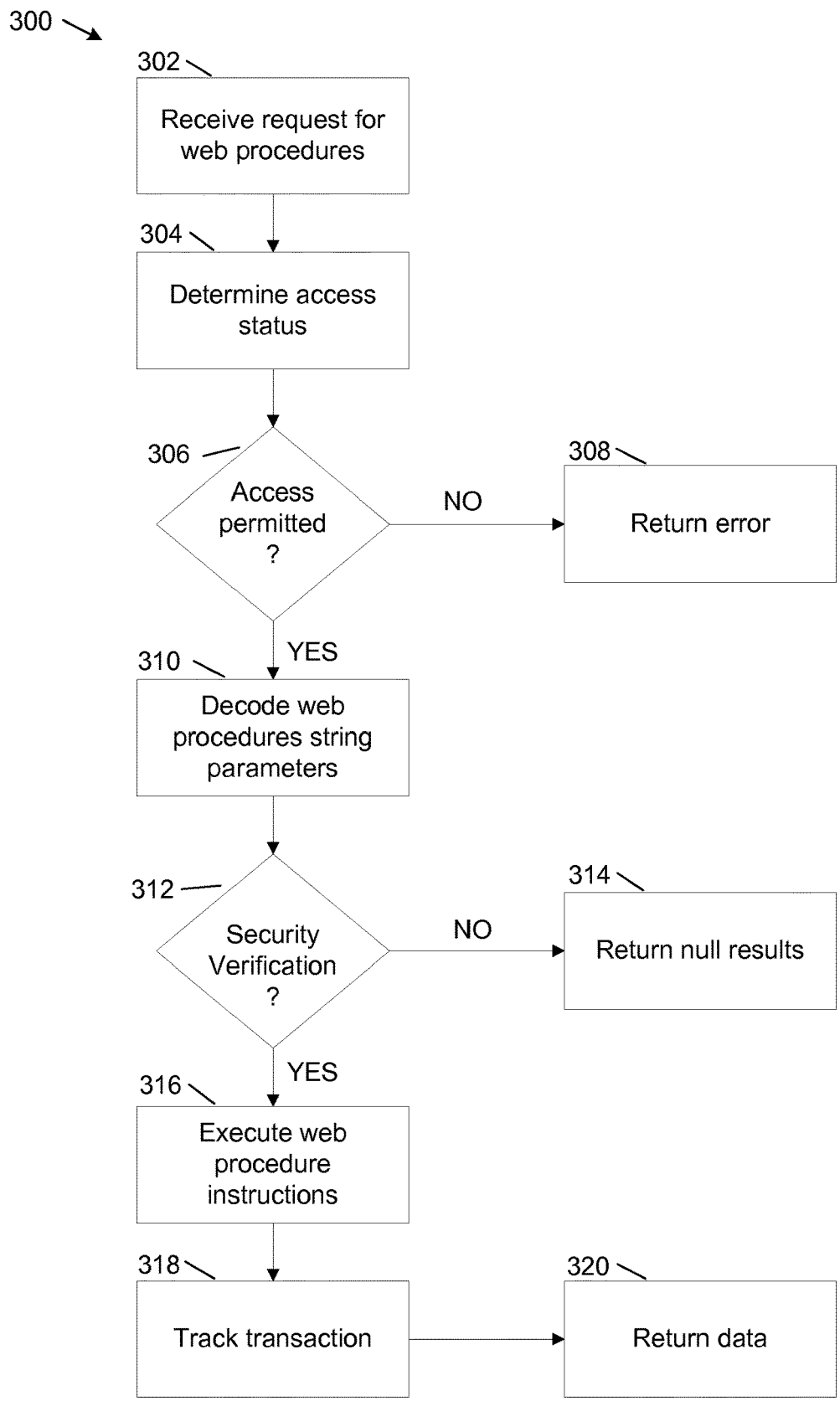
FIG. 3 shows a flowchart for an example method for processing a request for web services on a database.

FIG. 3 shows a flowchart of an example method 300 for processing on a database a request for web services. In some implementations, part of the request is processed on a web host before the database is accessed. In other implementations, part of the request is processed via a shared drive file, for example an HTML file, in conjunction with a client computer and a server computer.

At operation 302, a request is received at a database for web services. When the database is database 106, the request originates at a web browser on client computer 102 and is directed to web server computer 104. Web server computer 104 can then direct the request to database 106. When the database is database 120, the request originates from client computer 114 and is directed to database 120 via a shared drive 118 on server computer 116.

At operation 304, an access status is determined for the request for web services. One or more checks can be made on the request to authenticate the user who is requesting the web services. In addition, the web services catalog can be checked to determine accessibility for a person. The web services catalog can specify certain dates and times in which a user can obtain access. If the user tries to access the database at a time not allowed for the user, the request for web services can be rejected.

At operation 306, a determination can be made as to whether the user is an authorized user or one who can be entitled to guest user access. When a determination is made at operation 308 that access is not authorized for the web services, at operation 308 an error is returned to the client computer that generated the request for the web services.

At operation 310, a web procedures parameter string in the request for web services is decoded at the database, either database 106 or database 120, to determine whether the parameter string is in a proper format. Operation 310 comprises a security check on the web procedures parameter string. In order for the web procedure to access tables and other areas of the database, the web request needs to have a specific format. For example, as discussed earlier herein, a specific syntax may need to be required for certain SQL commands such as EXECUTE. If the SQL command is not in a proper format, the request for web services is rejected.

At operation 312, a determination is made as to whether there is a security violation in the web procedures parameter string. When a determination is made at operation 312 that there is a security violation, at operation 314, null results are returned to the user. Thus, when there is a security violation in the web procedures parameters string, no actual data is returned to the user. In addition, any malware in the web request is not permitted to execute on the database.

At operation 312, when a determination is made that the request for web services is in a proper format, at operation 316, the web procedures specified in the web procedures parameters string are executed.

At operation 318 an event is created corresponding to the executed web procedures and the event is tracked. Depending on whether the user is a registered user or a guest user, the event is tracked and stored at the database in a registered user event log or in a guest user event log.

At operation 320, when the syntax of a web procedure string is correct, valid data obtained from database tables is returned to the user. The results can be returned in a format specified by the user. Some example formats are a Microsoft EXEL file, an XML file or an HTML file. However, when the syntax of the web procedure string is incorrect, an error message can be returned to the user. The error message can inform the user why valid data was not returned. For example, the user may have requested to update a user name and the user name was not within expected parameters. As another example, the user may have requested to obtain a social security number or other information about a user, but the requested information was not available.

Figure 4:
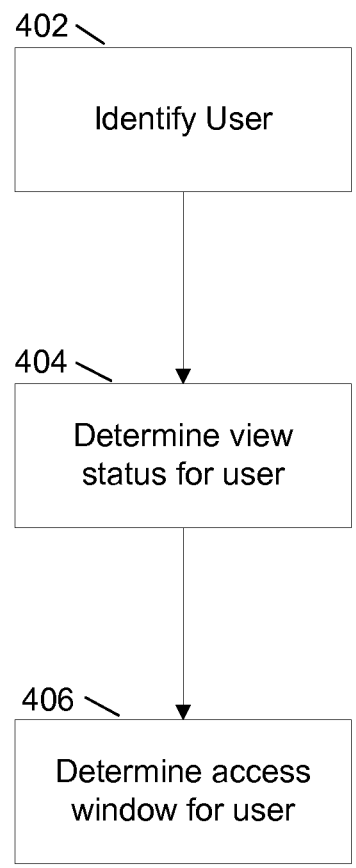
FIG. 4 shows a flowchart for an example determine access status operation of the method of FIG. 3.

FIG. 4 shows a flowchart for the example operation 304 of FIG. 3 for determining access status.

At operation 402, an identity of the user making a request for web services is determined. A more detailed explanation of how the user is identified is provided later herein in regard to FIG. 5.

At operation 404, a view status is determined for the user. The view status is determined from the web services catalog based on whether the user has been registered in the web services catalog with a master ID or whether the user is a guest user. A master ID is assigned to a user in the web services catalog when a user is registered in the web services catalog.

Users who have been registered in the web services catalog with a master ID have a privileged view of information within the web services catalog. Users who have been registered in the web services catalog as a guest user have a public view of information within the web services catalog. A public view is generally a restricted view of the information.

At operation 406, an access window for viewing information in the web services catalog is determined for the user. The access window identifies a date and time window in which the information can be viewed by the user. The date and time window is identified by fields within the web services catalog. When a date and time in which the user is requesting web services catalog information falls outside the permitted date and time window, the requested information is not returned to the user. Instead, an error message is returned.

The access window can be established in several ways. In one implementation, the access window can be globally built into the web services catalog to affect all users. In this implementation, all users would have the same access window. In another implementation, the access window can be targeted by being built into a database web procedure. When built into a database web procedure, the web procedure can specify a specific access window for a specific user or a group of users. In addition, restrictions other than date and time can be specified. For example, access can be restricted to specific devices, for example to a desktop computer but not to a smartphone.

The access window can also be established using role and user identifiers. For example, the web services catalog can specify a specific access window for a specific security role ID or a specific user name.

Figure 5:
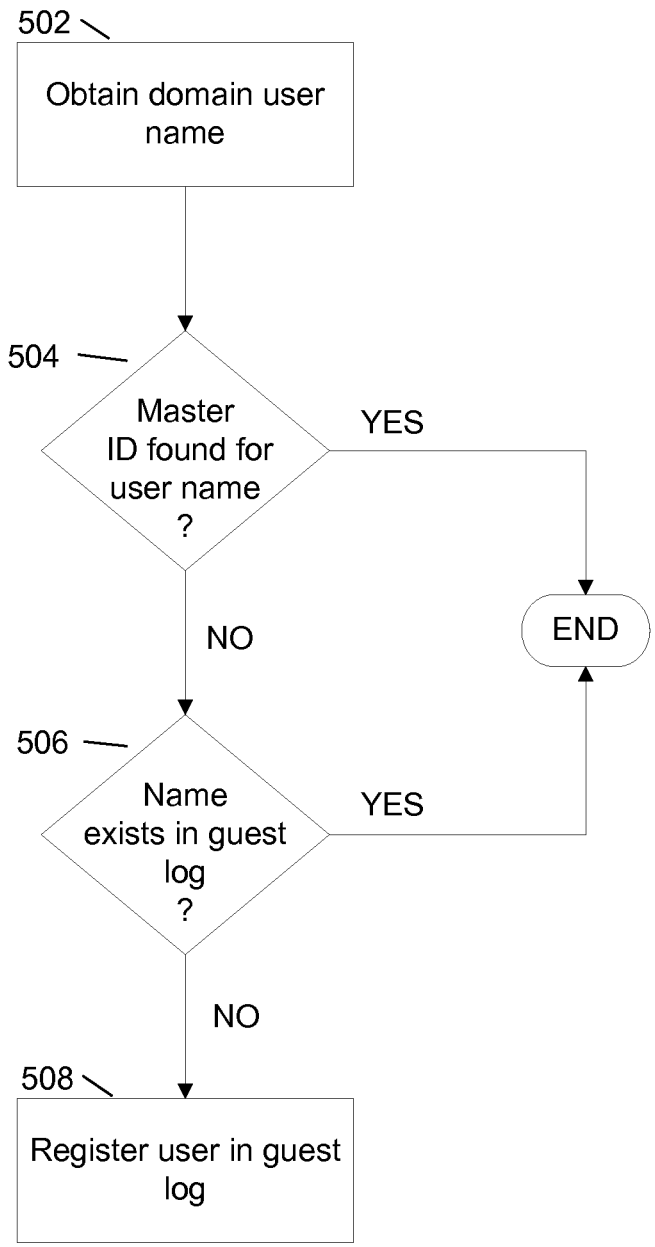
FIG. 5 shows a flowchart for an example identify user operation of the method of FIG. 4.

FIG. 5 shows a flowchart for the example operation 402 of FIG. 4 for identifying the user.

At operation 502, a domain user name is obtained for the user. The domain user name can be obtained from the access request for web procedures (operation 302).

At operation 504, a determination is made as to whether the web services catalog contains a master ID corresponding to the domain user name. When the web services catalog contains the master ID, the user is identified and method 402 ends.

When a determination is made at operation 504 that the web services catalog does not contain the master ID for the user, at operation 506, a determination is made as to whether the domain user name exists in a guest log table in the web services catalog. When the domain use name exists in the guest log table, the user is identified as a guest user and method 402 ends.

When a determination is made at operation 506 that the domain user name does not exist in the guest log table, the user is registered as a guest and the domain user name is entered as a guest in the web services catalog.

Figure 6:
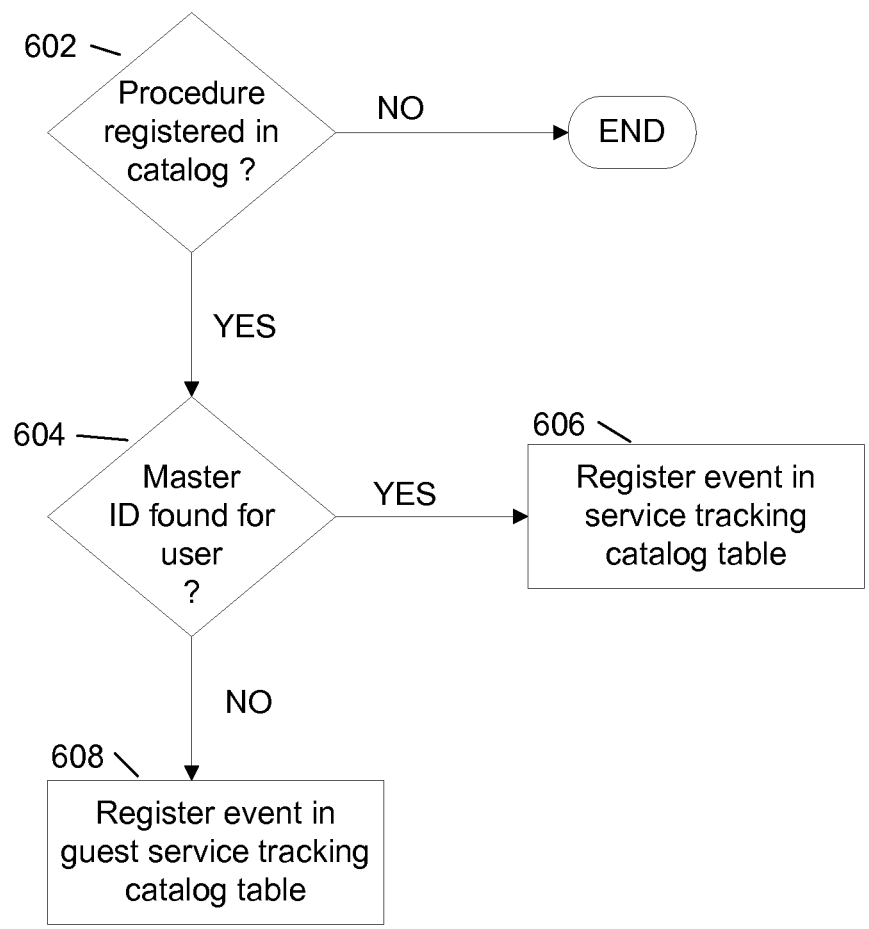
FIG. 6 shows a flowchart for an example track transaction operation of the method of FIG. 3.

FIG. 6 shows a flowchart for the example operation 318 of FIG. 3 for tracking a transaction. Tracking the transaction comprises adding an event to a table in the web services catalog for a procedure being executed. The table can be either a service tracking catalog table for the procedure or a guest service tracking catalog table for the procedure.

At operation 602, a determination is made as to whether the procedure being executed is registered in the web services catalog. A procedure can be registered by an administrator of the web services catalog or a person with similar authority. When the procedure is not registered in the web services catalog, operation 318 ends.

When a determination is made at operation 602 that the procedure is registered in the web services catalog, at operation 604, a determination is made as to whether a master ID is found for the user in the web services catalog.

When a determination is made at operation 604 that the master ID is found for the user in the web services catalog, at operation 606, the event corresponding to the procedure being executed is registered in a service tracking table in the web services catalog. When a determination is made at operation 604 that the master ID is not found for the user in the web services catalog, at operation 608, the event corresponding to the procedure being executed in registered in the guest service tracking table in the web services catalog.

Figure 7:
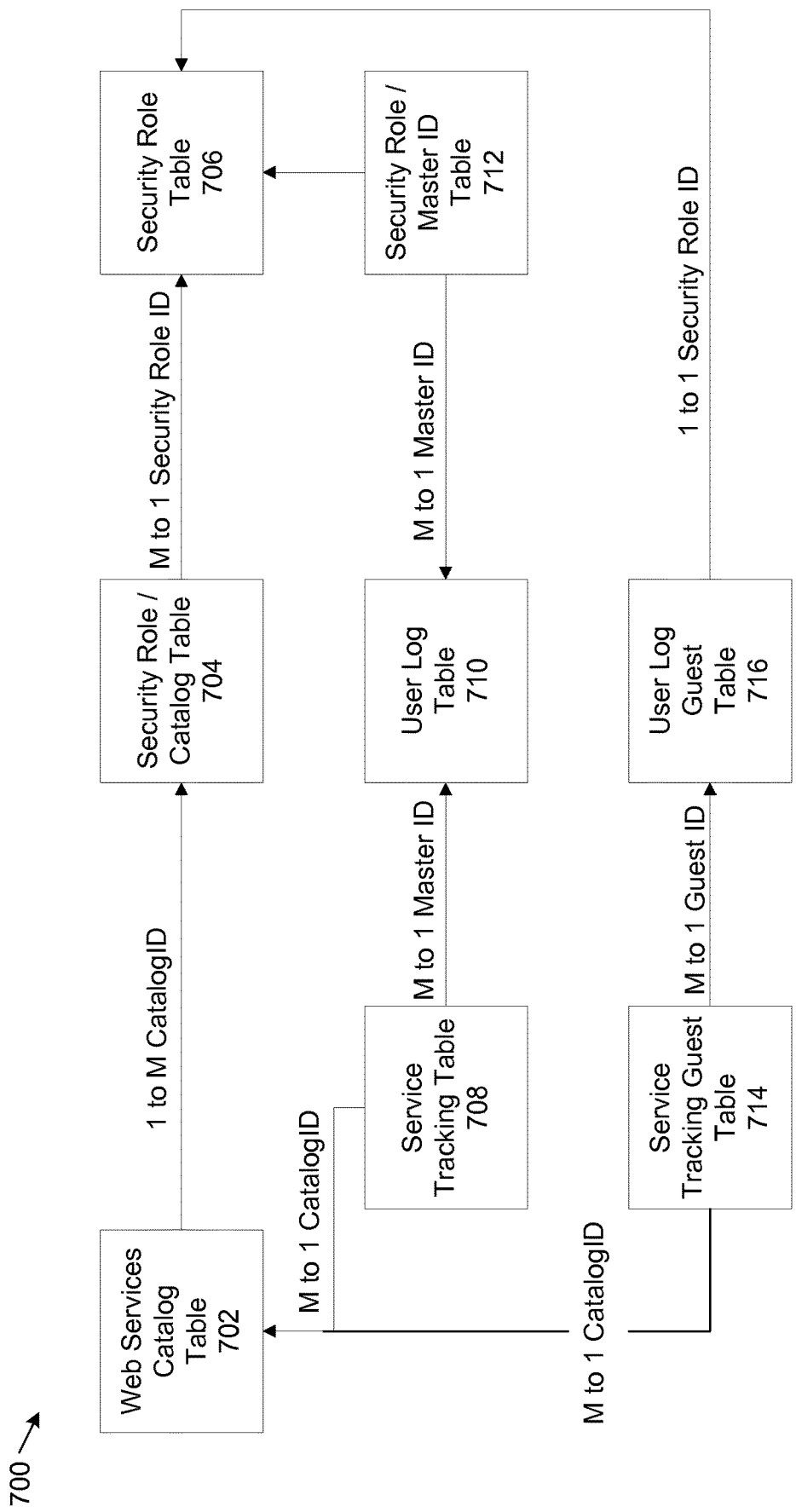
FIG. 7 shows an example diagram of relationships between various tables in the web services catalog.

FIG. 7 shows a diagram 700 showing relationships between various tables of the web services catalog. As shown in FIG. 7, the web services catalog includes a web services catalog table 702, a security role/catalog table 704, a security role table 706, a service tracking table 708, a user log table 710, a security role/master ID table 712, a service tracking guest table 714 and a user log guest table 716. Other web services catalog tables are possible.

The example web services catalog table 702 includes a dictionary of the tables, views, procedures, functions, users and roles in the web services catalog. A detailed description of the tables, views, procedures, functions, users and roles is provided later herein in regard to table 1.

The web services catalog table 702 contains IDs for each procedure registered in the web services catalog table 702. Because there can be a plurality of procedures registered, the web services catalog table 702 can contain a plurality of procedure IDs. For each procedure, the web services catalog provides a link to either the service tracking table 708 or the service tracking guest table 714. Thus, there is a separate table that tracks events for each procedure. The service tracking table 708 tracks events for a procedure for a registered user and the service tracking guest table 714 tracks events for a procedure for a guest user. As shown in FIG. 7, there is a M to 1 catalog ID relationship between each of the service tracking table 708 and the web services catalog table 702 and the service tracking guest table 714 and the web services catalog table 702.

Each tracking table has a separate catalog ID for each procedure. However, each tracking table is either associated with a user log table or a user log guest table. Thus, service tracking table 708 is linked to user log table 710 and service tracking guest table 714 is linked to user log guest table 716.

The web services catalog also includes a security role table 706. The security role table 706 provides security role information. A security role permits a user to access web services catalog procedures. Each security role is associated with a security role ID. The example security role/master ID table 702 stores linkages between a master ID for a user name and a security role. Linkages are provided from the security role/master ID table 712 to the security role table 706 and from the security role/master ID table 712 to the user log table 710. A linkage is also provided between the user log guest table 716 and the security role table 706.

The following table 1 lists example items stored in the web services catalog. More, fewer, or different items can be stored. As shown in the table below, the web services catalog lists tables, views, user types, role types, functions and procedures available in the database. The web services catalog 204 also lists any custom procedures that may be created by a database administrator or similar personnel. When requests are received for database access, calls can be made to the web services catalog to determine an access authorization level for a user making the request. The access authorization level can identify what type of information the user is permitted to access, a view of the information that the user is authorized to see and a date and time during which the user is authorized to view the information. The web services catalog can also verify that a requested procedure is available in the database. In addition, the web services catalog can assign security roles to users and guest users. The web services catalog can also track procedure events.

TABLE 1

Web Services Catalog Functionality

| Catalog ID | Type | Example Name | Description |
|---|---|---|---|
| 4 | Table | T_Catalog | Stores a dictionary of the tables, views, procedures, functions, users and roles in the web services catalog. |
| 7 | Table | T_TestData | Table used for a test procedure. |
| 12 | Table | T_UserLog | Daily snapshot of master user log, updated as changes are made. |
| 13 | Table | T_UserLogGuest | Records domain user names that are not found within master user log. |
| 14 | Table | T_SecurityRole | Provides role information. Roles permit a user to access web services catalog procedures. |
| 15 | Table | T_SecurityRoleCatalog | Creates a link between a security role ID and a catalog ID. |
| 16 | Table | T_SecurityRoleMID | Creates a link between a master ID and a security role ID. |
| 28 | Table | T_ServiceTracking | Tracks a procedure being called. |
| 29 | Table | T_ServiceTrackingGuest | Tracks procedures being called by guest users. |
| 32 | Table | T_DateDimensionIndicators | Stores holiday and peak day indicators for date dimension. |
| 42 | Table | T_TestSave | Demonstration table for the saving of data. |
| 5 | View | V_CatalogPublic | View which permits display of all public information from the web services catalog. |
| 9 | View | V_TestData | View created for testing data. |
| 10 | View | V_CatalogPrivileged | Permits display of all information within the web services catalog. |
| 17 | View | V_SecurityLookUp | Lists a domain user name and what catalog name it catalog name it can execute based on a role assigned. |
| 33 | View | V_CalendarDateIndicators | Permits display of the last 5 years of holiday/peak days. |
| 1 | User | U_ServerAdmin | Primary group, having full server system admin authority. |

TABLE 1-continued

Web Services Catalog Functionality

| Catalog ID | Type | Example Name | Description |
|---|---|---|---|
| 3 | User | U_WebHost | User account for a web host to gain access to the web server. |
| 2 | Role | R_WebHostRestricted | Primary role for the web host to connect to. It should contain only procedures and functions. |
| 18 | Function | F_SecurityVerification | Returns true if a domain user name is allowed access to a procedure. |
| 19 | Function | F_MIDInSecurityRole | Returns true if the user is part of the role; else returns false. |
| 20 | Function | F_DomainUsernameToMID | Returns a master ID corresponding to a domain user name. |
| 21 | Function | F_IsMID | Returns true if a master ID exists; else returns false. |
| 22 | Function | F_IsSecurityRoleID | Returns true if the role exists and is active; else returns false. |
| 23 | Function | F_ExistsMIDToSecurityRoleID | Returns true if master ID is linked to security role ID; else returns false. |
| 26 | Function | F_ExistsUserLogGuest | Returns true if a domain user name exists with a guest table; else returns false |
| 30 | Function | F_CatalogNameToCatalogID | Returns a catalog ID based on a catalog name provided; returns 0 if catalog name is not found. |
| 31 | Function | F_DomainUsernameToGuestID | Returns the Guest User ID corresponding to a domain user name. |
| 35 | Function | F_DatetoStringMMDDYYYY | Takes a date/time value and converts it to a string format MM/DD/YYYY |
| 37 | Function | F_WebServiceStringConversion | Converts a string from a web services procedure back to original text. |
| 41 | Function | F_ConvertDateTimeToDateMMDDYYYY | Converts a date time to a date in date/time format. |
| 6 | Procedure | P_CatalogPublic | Returns all public catalog information. |
| 8 | Procedure | P_TestData | Procedure used to test the web services. |
| 11 | Procedure | P_CatalogPrivileged | Returns privileged catalog information. |
| 24 | Procedure | P_SecurityRoleIdMIDLink | Creates a link between a master ID for a domain user name and a security role ID. |
| 25 | Procedure | P_SecurityRoleIdMIDDeLink | Destroys a link between a master ID for a domain user name and a security role ID. |
| 27 | Procedure | P_RegisterGuestUser | Registers a user as a guest when there is no master ID for the guest user. |
| 34 | Procedure | P_CalendarDateIndicators | Returns dates for the last 5 years that are holidays or peak days. |
| 36 | Procedure | P_Alerts | Returns a list of alerts applicable to a user calling a procedure. |
| 38 | Procedure | P_TestSelectBox | Tests select box auto fill code. |
| 39 | Procedure | P_UserWelcomeMessage | Displays a welcome message on a user interface of a client computer. |
| 40 | Procedure | P_TestDataFilter | Tests date filtering of a query request. |

TABLE 1-continued

Web Services Catalog Functionality

| Catalog ID | Type | Example Name | Description |
|---|---|---|---|
| 43 | Procedure | P_TestSave | Tests data save functionality. |
| 44 | Procedure | P_ServiceTracking | Tracks request being called and stores event in service tracking tables. |

As illustrated in the example of FIG. 8, database 106 runs on an electronic computing device that includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the electronic computing device, such as during startup, is stored in the ROM 812. The electronic computing device further includes a mass storage device 814. The mass storage device 814 is able to store software instructions and data. A central processing unit, system memory and mass storage device similar to that in FIG. 8 are also included in each of web server computer 104, server computer 116 and a computer platform for database 120.

The mass storage device 814 is connected to the CPU 802 through a mass storage controller (not shown) connected to the system bus 822. The mass storage device 814 and its associated computer-readable data storage media provide non-volatile, non-transitory storage for the electronic computing device. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the electronic computing device.

According to various embodiments of the invention, the electronic computing device may operate in a networked environment using logical connections to remote network devices through the network 820, such as a wireless network, the Internet, or another type of network. The electronic computing device may connect to the network 820 through a network interface unit 804 connected to the system bus 822. It should be appreciated that the network interface unit 804 may also be utilized to connect to other types of networks and remote computing systems. The electronic computing device also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the electronic computing device can store software instructions and data. The software instructions include an operating system 818 suitable for controlling the operation of the electronic computing device. The mass storage device 814 and/or the RAM 810 also store software instructions, that when executed by the CPU 802, cause the electronic computing device to provide the functionality of the electronic computing device discussed in this document. For example, the mass storage device 814 and/or the RAM 810 can store software instructions that, when executed by the CPU 802, cause the electronic computing device to display received data on the display screen of the electronic computing device.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A first electronic computing device comprising:
a processing unit; and
system memory, a first electronic database installed on the first electronic computing device and stored in the system memory, the system memory including instructions which, when executed by the processing unit, cause the first electronic database to:
receive an access request from a second electronic computing device to access information stored on the first electronic database, the access request including a uniform resource locator having web procedure string parameters;
use a web services catalog that is part of the first electronic database to determine an access authorization level for the request; and
when a determination is made that the access authorization level is valid for the request:
perform a security check for malware in the uniform resource locator of the access request, including to check a syntax of a command in the web procedure string parameters of the uniform resource locator for conformance with a predetermined format;
when a determination is made that the syntax is valid:
obtain the requested information from one or more tables in the first electronic database; and send the requested information to the second electronic computing device.

2. The first electronic computing device of claim 1, further comprising:
send a request from the first electronic database to a second electronic database to access information stored on the second electronic database; and
receive the information from the second electronic database.

3. The first electronic computing device of claim 1, wherein receive a request from the second electronic computing device to access information stored on the first electronic database comprises receiving a request from a web server computer to access information on the first electronic database.

4. The first electronic computing device of claim 1, wherein receive a request from the second electronic computing device to access information stored on the first database comprises receiving a request from a client computer via a shared data file to access information on the first electronic database.

5. The first electronic computing device of claim 1, wherein the accessing of information stored on the first electronic database is limited to one or more procedures stored on the first electronic database.

6. The first electronic computing device of claim 1, wherein determine an access authorization level for the request comprises determining a role status for a user and a subset of database information that can be accessed by the user.

7. The first electronic computing device of claim 1, wherein determine an access authorization level for the request comprises:
determine a time period during which the first electronic database can be accessed for a user having the access authorization level;
identify a current time period; and
determine whether the user can access the database during the current time period.

8. The first electronic computing device of claim 1, wherein perform a security check on the access request comprises decoding a parameter string in the request to determine whether the request is in a proper format.

9. The first electronic computing device of claim 8, wherein after a determination that the parameter string is in an incorrect format, returning a null output for the access request.

10. The first electronic computing device of claim 1, further comprising logging each access request to either a guest user event log or to a user event log.

11. The first electronic computing device of claim 1, further comprising tracking each access request and each result of each access request to an event tracking log.

12. The first electronic computing device of claim 1, further comprising permitting the selection of an output format for the requested information, the selection being made from one of a plurality of formats, the plurality of formats including HTML and XML.

13. A first electronic computing device comprising:
a processing unit; and
system memory, a first electronic database installed on the first electronic computing device and stored in the system memory, the system memory including instructions which, when executed by the processing unit, cause the first electronic database to:
receive an access request from a second electronic computing device to access information stored on the first electronic database, the access request including a uniform resource locator having web procedure string parameters with at least one Structured Query Language command;
use a web services catalog that is part of the first electronic database to determine an access authorization level for the request, the determination of the access authorization level comprising:
determining an identity of a user making the request;
determining an authorization level for the user; and
determining a date and time for which the user is authorized to make the request;
when a determination is made that the access authorization level is valid for the request:
perform a security check that no unexpected characters are included in a command used in the uniform resource locator of the access request, including to check a syntax of the command in the web procedure string parameters of the uniform resource locator for conformance with a predetermined format;
when a determination is made that the syntax is valid:
obtain the requested information from one or more tables in the first electronic database; and
send the requested information to the second electronic computing device;
identify information to be requested from a second electronic database;
send a request for the identified information directly to the second electronic database; and
receive the identified information from the second electronic database; and
when a determination is made that the access authorization level is not valid for the request, send a null output to the second electronic computing device.

* * * * *